(12) United States Patent
Tanaka (10) Patent No.: US 12,501,126 B2
(45) Date of Patent: Dec. 16, 2025

(54) SENSOR MODULE

(71) Applicant: Sony Semiconductor Solutions Corporation, Kanagawa (JP)

(72) Inventor: Haruki Tanaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 107 days.

(21) Appl. No.: 18/269,741

(22) PCT Filed: Dec. 14, 2021

(86) PCT No.: PCT/JP2021/046006
§ 371 (c)(1),
(2) Date: Jun. 26, 2023

(87) PCT Pub. No.: WO2022/149414
PCT Pub. Date: Jul. 14, 2022

(65) Prior Publication Data
US 2024/0073498 A1  Feb. 29, 2024

(30) Foreign Application Priority Data
Jan. 8, 2021  (JP) .................. 2021-002374

(51) Int. Cl.
*H04N 23/51*  (2023.01)
(52) U.S. Cl.
CPC .................. *H04N 23/51* (2023.01)
(58) Field of Classification Search
CPC . B23K 26/24; B29C 65/1635; B29C 65/1677; B29C 66/112; B29C 66/114;
(Continued)

(56) References Cited

U.S. PATENT DOCUMENTS

2014/0037914 A1* 2/2014 Fujimoto .......... B29C 66/24221
                                                        156/272.8
2016/0018624 A1* 1/2016 Yeo .......................... G02B 7/08
                                                        359/557
(Continued)

FOREIGN PATENT DOCUMENTS

CN      210142251 U      3/2020
JP      2010-221572 A    10/2010
(Continued)

OTHER PUBLICATIONS

International Search Report and English translation thereof mailed Feb. 8, 2022 in connection with International Application No. PCT/JP2021/046006.

*Primary Examiner* — Amy R Hsu
(74) *Attorney, Agent, or Firm* — Wolf, Greenfield & Sacks, P.C.

(57) ABSTRACT

[Object] To provide a sensor module that makes it possible to suppress generation of resin burrs and improve workability.
[Solving Means] A sensor module (100) according to an embodiment of the present technology includes a sensor element, a first case (11), a second case (12), and a groove (70). The first case (11) includes an opening end including a first welded region and accommodates therein the sensor element. The second case (12) includes a joining surface (123) including a second welded region (50), the second welded region (50) being welded to the first welded region to form a welded portion. The groove (70) is formed in at least one of the first welded region or the second welded region (50).

12 Claims, 9 Drawing Sheets

(58) Field of Classification Search
CPC ............ B29C 66/322; B29C 66/73921; B29K
2507/04; B29L 2031/3481; G03B 17/02;
G03B 30/00; H04N 23/51; H04N 23/57
See application file for complete search history.

(56) References Cited

U.S. PATENT DOCUMENTS

| | | | |
|---|---|---|---|
| 2018/0035029 A1* | 2/2018 | Wang | H05K 1/181 |
| 2018/0098033 A1* | 4/2018 | Mleczko | B60R 11/04 |
| 2020/0088976 A1* | 3/2020 | Song | H04N 23/90 |
| 2020/0174343 A1* | 6/2020 | Li | H04N 23/45 |
| 2020/0196142 A1* | 6/2020 | Yang | H04W 12/02 |
| 2021/0392251 A1* | 12/2021 | Wang | H04N 23/55 |
| 2022/0201169 A1* | 6/2022 | Huang | H04N 23/57 |

FOREIGN PATENT DOCUMENTS

| | | |
|---|---|---|
| JP | 2018-173431 A | 11/2018 |
| JP | 2019-155694 A | 9/2019 |
| WO | WO 2010/035696 A1 | 4/2010 |

\* cited by examiner (A)

SENSOR MODULE

CROSS-REFERENCE TO RELATED APPLICATIONS

This application claims the benefit under 35 U.S.C. § 371 as a U.S. National Stage Entry of International Application No. PCT/JP2021/046006, filed in the Japanese Patent Office as a Receiving Office on Dec. 14, 2021, which claims priority to Japanese Patent Application Number JP2021-002374, filed in the Japanese Patent Office on Jan. 8, 2021, each of which is hereby incorporated by reference in its entirety.

TECHNICAL FIELD

The present technology relates to a sensor module mounted on, for example, a vehicle.

BACKGROUND ART

For example, an electronic component or an optical component, such as a rear-view camera unit for automobile, which is placed outside of a vehicle (outdoors), is accommodated in a waterproof and dustproof case. As such a case, there is known a case in which a front case and a rear case are joined to each other using welding by irradiation of laser light as disclosed in, for example, Patent Literature 1. In the case having such a structure, the melted resin generated by the irradiation of laser light protrudes to the outer peripheral side of the jointed region of the front case and the rear case, so-called resin burrs are generated, and the appearance of the product is liable to be deteriorated.

In order to solve such a problem, for example, Patent Literature 2 describes a technique in which, in a welding method of applying laser light onto joining surfaces of an absorbent resin material that absorbs laser light and a transmissive resin material that transmits the laser light and of welding both the resin materials, grooves capable of accommodating the melted resin are formed on both sides of a scanning locus of the laser light onto the joining surface of the transmissive resin material.

Further, Patent Literature 3 describes that a stepped structure for fitting a bottomed cylindrical case main body and a cover member is provided to the joining surfaces of the case main body and the cover member, to form a welded portion on the inner side of the case main body relative to that stepped structure.

CITATION LIST

Patent Literature

Patent Literature 1: Japanese Patent Application Laid-open No. 2018-173431
Patent Literature 2: Japanese Patent Application Laid-open No. 2010-221572
Patent Literature 3: Japanese Patent Application Laid-open No. 2019-155694

DISCLOSURE OF INVENTION

Technical Problem

However, the structure described in Patent Literature 1 needs a space for providing the grooves on both sides of a welded region that is a scanning region of laser light, and the joining surfaces of both resin materials increase by the region in which the grooves are formed, which becomes an obstacle to miniaturization of the product. Further, in the structure described in Patent Literature 2, since a space for providing the stepped structure on the outer peripheral side of the welded portion irradiated with laser light is required, it is an obstacle to the miniaturization of the product as described above. Further, in the structures of Patent Literatures 1 and 2, it is necessary to precisely adjust a laser irradiation position with respect to a component, and there is a problem that it is easily affected by variations in component dimensions. In this regard, it is desired to reduce the appearance defect, to improve the workability (productivity) by eliminating the necessity to remove a protruding portion and precisely adjust the laser irradiation position, and to reduce the size of the product.

In view of the circumstances described above, it is an object of the present technology to provide a sensor module that makes it possible to suppress generation of resin burrs and improve workability.

Solution to Problem

In order to achieve the object described above, a sensor module according to an embodiment of the present technology includes a sensor element, a first case, a second case, and a groove.

The first case includes an opening end including a first welded region and accommodates therein the sensor element.

The second case includes a joining surface including a second welded region, the second welded region being welded to the first welded region to form a welded portion.

The groove is formed in at least one of the first welded region or the second welded region.

In the sensor module, the melted portions of the first case and the second case can be caused to escape to the groove. Thus, it is possible to suppress protrusion of the melted portions of the first case and the second case to the outside and reduce an appearance defect.

The groove may be formed over an entire circumference of the first welded region or the second welded region.

The groove may be formed continuously over the entire circumference of the first welded region or the second welded region.

The groove may include a plurality of first grooves formed in parallel over the entire circumference of the first welded region or the second welded region.

The number of the plurality of first grooves may be three or more.

The plurality of first grooves may be formed more densely toward an outer side of the first welded region or the second welded region.

Among the plurality of first grooves, a first groove located on an outermost side of the joining surface may have a cross-sectional area larger than a cross-sectional area of a first groove located on an innermost side of the joining surface.

Among the plurality of first grooves, a first groove located on an outermost side of the joining surface may have a width or depth larger than a width or depth of a first groove located on an innermost side of the joining surface.

The groove may further include a plurality of second grooves extending in a direction intersecting with the plurality of first grooves.

The opening end may further include a stepped surface that is formed outside of the first welded region in parallel to the first welded region.

The joining surface may further include a parallel surface that is formed outside of the second welded region in parallel to the second welded region.

The stepped surface and the parallel surface may face each other via a gap.

The first case may be made of a resin material that absorbs laser light of the predetermined wavelength.

The second case may be made of a resin material that transmits the laser light of the predetermined wavelength.

The groove may be filled with the resin material melted from the first case or the second case.

The sensor element may be an imaging device.

The first case and the second case may be joined to each other using laser welding.

BRIEF DESCRIPTION OF DRAWINGS

FIG. 4(A) is an exploded perspective view of the sensor module, and (B) is an enlarged view of a portion A in (A).

FIG. 5(A) is a cross-sectional view of the vicinity of the welded portion of the sensor module, and (B) is a cross-sectional view that is similar to the view of FIG. 3 and used to describe a process of welding a first case and a second case in the sensor module.

FIG. 6(A) is an exploded perspective view of a sensor module according to a second embodiment of the present technology, and (B) is an enlarged view of a portion B in (A).

MODE(S) FOR CARRYING OUT THE INVENTION

Embodiments according to the present technology will now be described below with reference to the drawings.

First Embodiment

[Configuration of Sensor Module]

Figure 1:
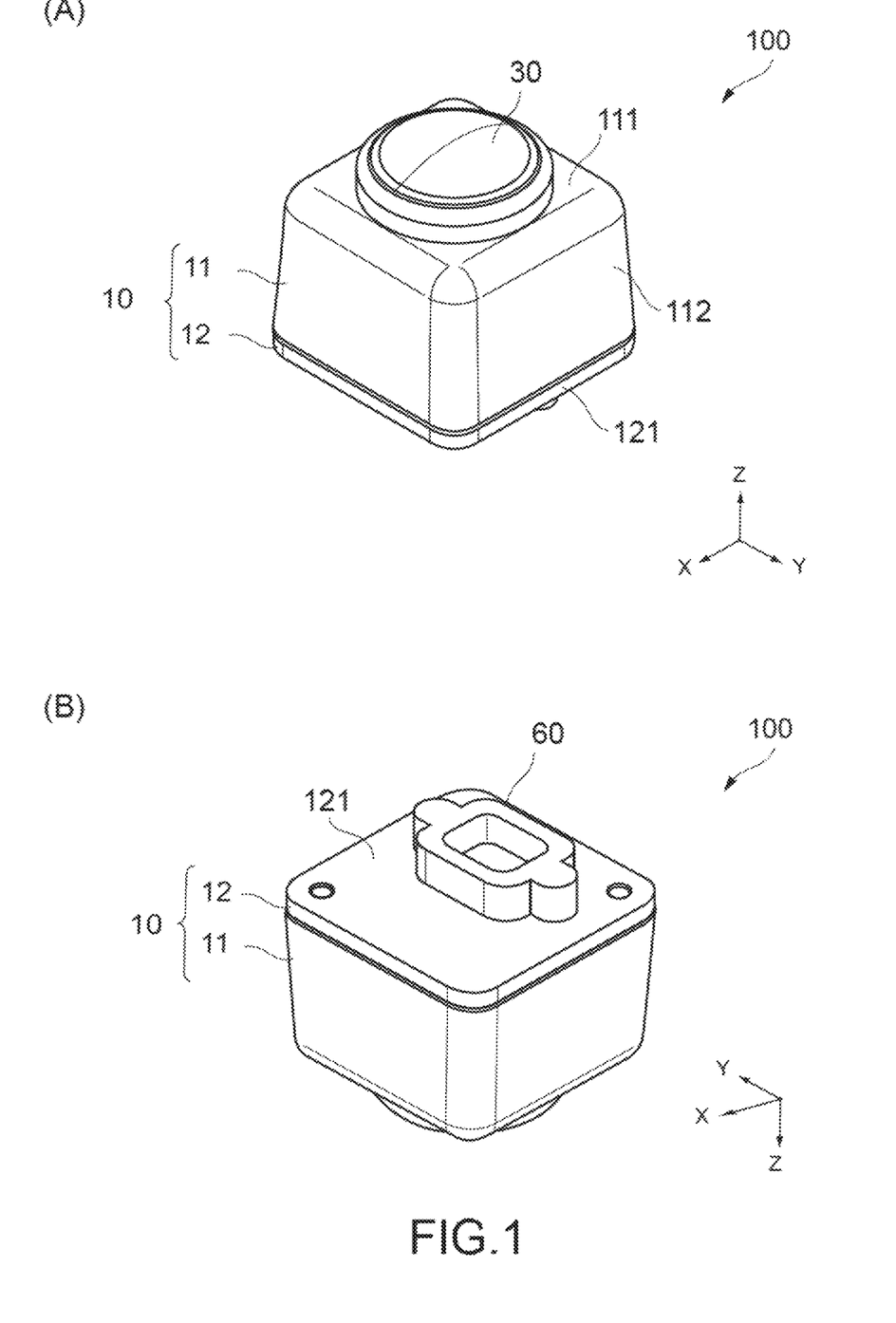
FIG. 1 is an overall perspective view of a sensor module according to an embodiment of the present technology, in which (A) is a view seen from the front side, and (B) is a view seen from the back side.
Figure 2:
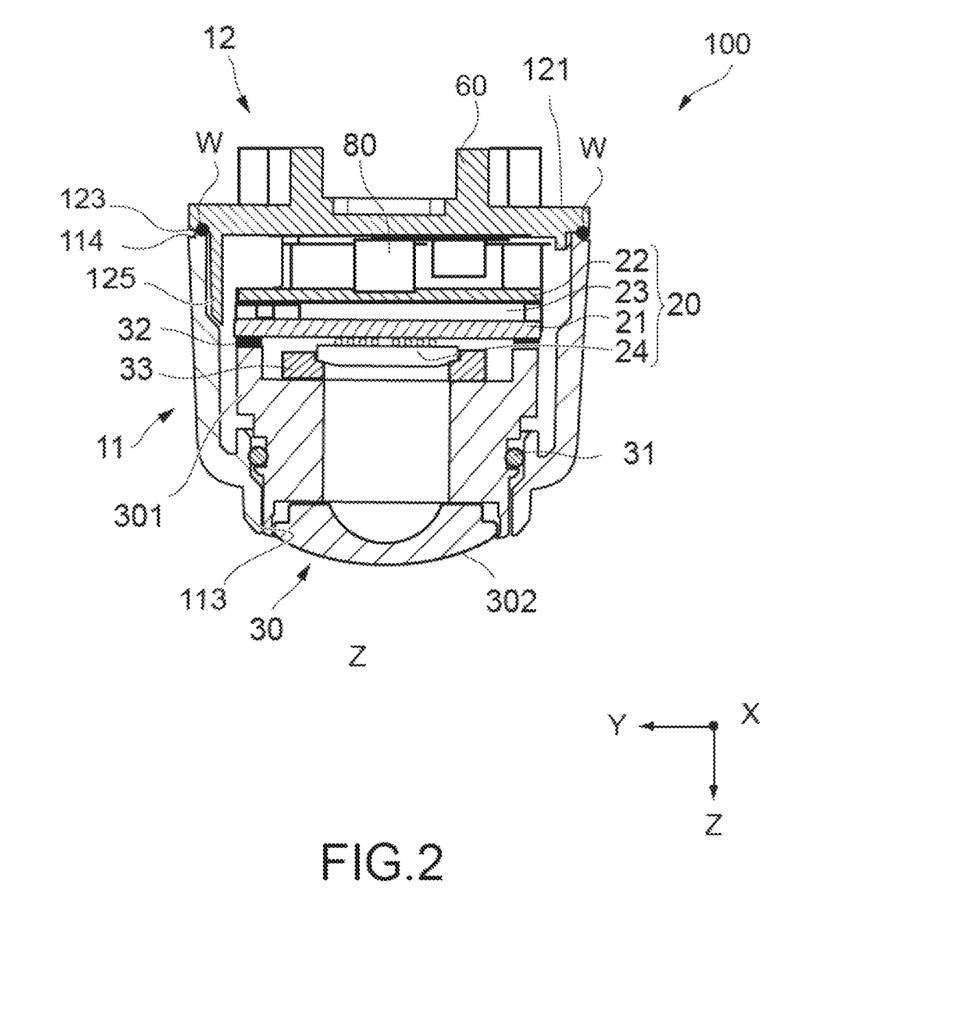
FIG. 2 is a longitudinal cross-sectional view of the sensor module.
Figure 3:
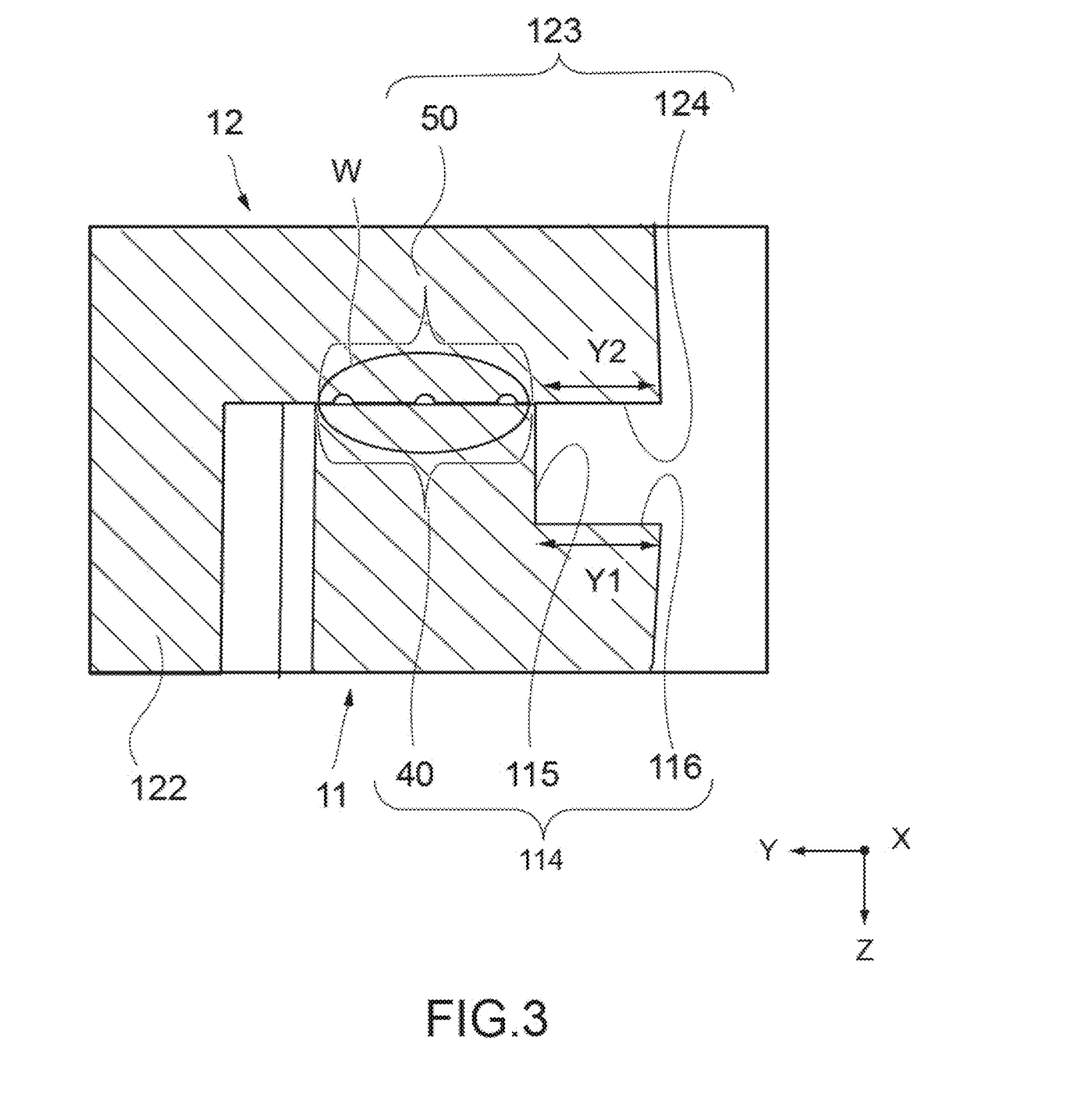
FIG. 3 is an enlarged view of a welded portion in FIG. 2.

(A) and (B) of FIG. 1 are overall perspective views of a sensor module 100 according to a first embodiment of the present technology. FIG. 2 is a longitudinal cross-sectional view of the sensor module 100. FIG. 3 is an enlarged view of a welded portion W in FIG. 2. An X axis, a Y axis, and a Z axis in each figure respectively represent directions of three axes that are orthogonal to each other, and the Z axis corresponds to an optical-axis direction of the sensor module 100.

The sensor module 100 of this embodiment is a camera module used by being mounted on a vehicle. For example, the sensor module 100 is disposed outside of a vehicle body (an attachment target) (not illustrated), and captures an image of a region situated ahead of a vehicle, an image of a region situated behind the vehicle, or a region on a lateral side of the vehicle depending on an attachment position.

For example, the sensor module 100 attached to a front portion (for example, a radiator grille) of a vehicle body captures an image of an environment ahead of the vehicle. Further, the sensor module 100 attached to a rear portion (for example, above a license plate) of the vehicle body captures an image of an environment behind the vehicle. Furthermore, the sensor module 100 attached to a side portion of the vehicle (for example, an upper portion of a pillar (an A-pillar, a B-pillar, or a pillar (a C-pillar, a D-pillar) situated in a rearmost portion of the vehicle, or a sideview mirror) captures an image of an environment in a lateral direction of the vehicle.

As illustrated in FIGS. 1 and 2, the sensor module 100 includes, for example, a housing 10, a sensor board 20, and a barrel member 30.

The housing 10 is a case unit that is configured by a front case 11 that is a first case, and a rear case 12 that is a second case, which are combined in the optical-axis direction (the Z-axis direction). Typically, the front case 11 and the rear case 12 are injection-molded bodies made of a synthetic resin material.

The front case 11 includes a front surface portion 111 that is formed substantially perpendicular to the optical-axis direction (the Z-axis direction), and a lateral surface portion 112 that extends toward the rear case 12 from a peripheral edge of the front surface portion 111. In this embodiment, the front surface portion 111 and the lateral surface portion 112 are substantially rectangular as viewed from the Z-axis direction. The front case 11 is hollow, and a space portion that accommodates, for example, the sensor board 20 and the barrel member 30 therein is formed in a region surrounded by the front surface portion 111 and the lateral surface portion 112.

The front surface portion 111 of the front case 11 includes an opening 113 in a middle portion of the front surface portion 111 (refer to FIG. 2), and the barrel member 30 is fitted into the opening 113 as will be described later. Further, at an end of the lateral surface portion 112 on the side of the rear case 12, the front case 11 includes an opening end 114 that is to be welded to the rear case 12 (refer to FIG. 3). The opening end 114 is formed to be substantially rectangular correspondingly to an outer shape of the front surface portion 111. Note that the front surface portion 111 and the opening end 114 are not limited to being rectangular, and may be formed into another shape, such as a circular shape or a triangular shape.

The rear case 12 is formed into a generally rectangular plate shape that includes a bottom surface portion 121 that is formed substantially perpendicular to a front-rear direction, and a lateral surface portion 122 that extends to protrude toward the front case 11 from the vicinity of a peripheral edge of the bottom surface portion 121. On the outer peripheral side of the lateral surface portion 122 in the bottom surface portion 121, a rectangularly annular joining surface 123 that is to be welded to the opening end 114 of the front case 11 is formed (refer to FIG. 3). In this embodiment, the front case 11 and the rear case 12 are integrated with each other by the joining surface 123 being joined to the opening end 114 using laser welding. This will be descried later.

The barrel member 30 is disposed in the front case 11. The barrel member 30 includes a barrel portion 301 that is fitted into the opening 113 through a seal ring 31 in the optical-axis Z direction. The barrel portion 301 is a cylindrical portion that supports an imaging lens 302, and the imaging lens 302 protrudes forward of the front case 11 from the opening 113.

The sensor board 20 is disposed in the housing 10. The sensor board 20 includes a front board 21 that faces the front surface portion 111 of the front case 11, a rear board 22 that faces the bottom surface portion 121 of the rear case 12, and a spacer 23 that is disposed between the front board 21 and the rear board 22.

The front board 21 and the rear board 22 are rigid double-sided circuit boards such as glass epoxy boards, and a facing distance between the boards is defined by the spacer 23. The front board 21 and the rear board 22 are mechanically and electrically connected to each other through a board connector (a B-to-B connector) (not illustrated). The sensor board 20 is not limited to being formed of two boards that are the front board 21 and the rear board 22, and may be formed of a single board.

An imaging device 24 is mounted on the front board 21 as a sensor element. The imaging device 24 is an image sensor such as a complementary metal-oxide semiconductor (CMOS) image sensor or a charge coupled device (CCD) image sensor. The front board 21 is joined to the barrel portion 301 through a joining member 32 and a cushion member 33, and the imaging device 24 is disposed on an optical axis of the imaging lens 302.

Further, the rear board 22 is electrically connected to a connector 60, which is provided to the bottom surface portion 121 of the rear case 12, through a flexible printed circuit 80. The connector 60 is used to electrically connect the sensor board 20 and a vehicle body. Through the connector 60, power is supplied from the vehicle body to the sensor board 20, and an image signal (an output signal of the imaging device 24) is transmitted from the sensor board 20 to the vehicle body.

Note that, for example, a shield case that is used for electromagnetic noise shielding and surrounds the sensor board 20, a dustproof sheet, and a heat dissipating sheet are disposed in the housing 10, although this is not illustrated. One of ends of the shield case is fitted around the barrel member 30, and another of the ends of the shield case is brought into elastic contact with an inner surface of the bottom surface portion 121 of the rear case 12. Accordingly, the shield case serves as a biasing member that biases the barrel member 30 and the sensor board 20 jointed to the barrel member 30 toward the front case 11.

Figure 5:
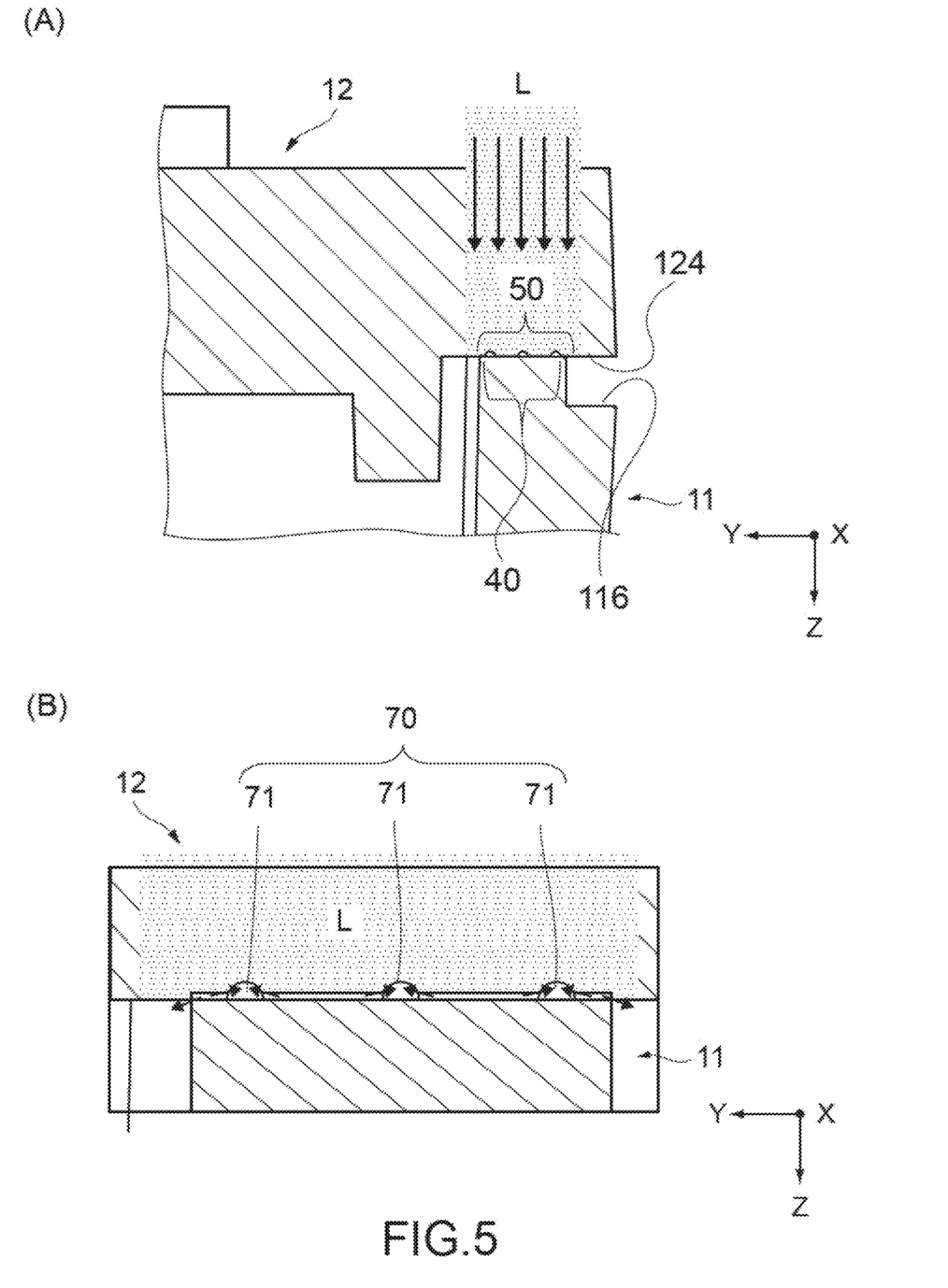

The front case 11 and the rear case 12 are joined to each other using laser welding. In this embodiment, the front case 11 is made of a synthetic resin material that has absorptive properties with respect to laser light L of a predetermined wavelength (refer to FIG. 5(A)). Further, the rear case 12 is made of a synthetic resin material that has transmissive properties with respect to the laser light L.

For example, a general-purpose resin such as an acrylonitrile-styrene (AS) resin or an acrylonitrile-butadiene-styrene (ABS) resin, a polycarbonate (PC) resin, a mixture resin of ABS and PC, a polyamide (PA) resin, or a polybutylene terephthalate (PBT) resin is used as a resin material that has absorptive properties or transmissive properties with respect to the laser light L.

The absorptive properties or the transmissive properties with respect to the laser light L can be adjusted by, for example, the amount of a laser-absorptive material that is mixed with a resin. For example, carbon black can be used as the laser-absorptive material. The adjustment of the amount of the laser-absorptive material added makes it possible to discretionarily adjust the absorptance (or the transmittance) of the laser light L. Note that it is favorable that the same type of matrix resin be used for a resin material having absorptive properties with respect to the laser light L and a resin material having transmissive properties with respect to the laser light L. This results in increasing an affinity between resins situated at a joining portion and in enhancing the weld strength. Further, a change in a thickness of a resin makes it possible to adjust the transmittance. When the thickness of a resin is made larger (when a resin is made thicker), this makes it possible to further decrease the transmittance of the resin. Further, when the thickness of a resin is made smaller (when a resin is made thinner), this makes it possible to further increase the transmittance of the resin.

In this embodiment, for example, red laser light or infrared laser light of a wavelength of from 800 nm to 1100 nm is used as the laser light L used for welding. With respect to a resin material having transmissive properties with respect to the laser light L, the transmittance of the resin material with respect to the laser light L is greater than or equal to 30%, and favorably greater than or equal to 40%. A spot diameter of the laser light L is, for example, 1 mm.

[Details of Welded Portion]

As shown in FIGS. 2 and 3, the front case 11 includes the opening end 114 including a first welded region 40, and accommodates the sensor element 24 in the opening end 114. The welded region used herein refers to a region in which the front case 11 and the rear case 12 are welded to each other by the laser light L applied thereto. In this embodiment, the welded region is a region irradiated with the laser light L. The first welded region 40 is formed to be substantially rectangular correspondingly to an outer shape of the front surface portion 111, but it is not limited to being rectangular and may be formed into another shape, such as a circular shape or a triangular shape, correspondingly to an shape of the opening end 114. Further, the first welded region 40 is favorably provided in parallel to a second welded region 50, which will be described later, and to the XY-plane.

As shown in FIGS. 2 and 3, the rear case 12 includes the joining surface 123 including a second welded region 50 that is welded to the first welded region 40 to form the welded portion W.

The joining surface 123 is rectangularly annular. As will be described later, the first welded region 40 and the second welded region 50 are welded to each other by the irradiation with the laser light L, so that the front case 11 and the rear case 12 are integrated with each other to form the housing 10.

As shown in FIG. 3, the joining surface 123 includes the second welded region 50 that is welded to the first welded region 40 of the front case 11. The second welded region 50 is formed to be rectangularly annular, but it is not limited thereto and only needs to be formed in a shape corresponding to the first welded region 40 to be welded. The corresponding shape herein refers to, for example, a relationship in which if the first welded region 40 is rectangular, the second welded region 50 is also rectangular, and if the first welded region 40 is circular, the second welded region 50 is also circular similarly to the first welded region 40.

The welded portion W is a portion formed by welding the first welded region 40 and the second welded region 50 to each other. In other words, the welded portion W is a portion at which the front case 11 and the rear case 12 are welded to each other by the resin melted by irradiating the first welded region 40 and the second welded region 50 with the laser light L. The welded portion W is favorably formed over the entire circumference of the first welded region 40 and the second welded region 50. This ensures the sealing properties of the welded portion W between the front case 11 and the rear case 12. The melted resin is not limited to a resin obtained when a resin having absorptive properties with respect to the laser light L absorbs the laser light L to be heated and melted, but is also a resin having transmissive properties. The melted resin also includes, for example, a resin melted by heat generation of a resin having absorptive properties.

As shown in FIG. 3, the opening end 114 of the front case further includes a stepped surface 116 that is formed outside of the first welded region 40 via a stepped portion 115 and is parallel to the first welded region 40. The stepped portion 115 is formed to extend downward from the first welded region 40 toward the stepped surface 116 in FIG. 3. The stepped portion 115 is favorably formed perpendicularly to the first welded region 40. Further, the stepped surface 116 is favorably parallel to the first welded region 40, but as a matter of course, the present technology is not limited thereto. In addition, the stepped surface 116 is provided over the entire circumference of the rear case 12 along the first welded region 40, but the present technology is not limited thereto.

Further, as shown in FIG. 3, the joining surface 123 of the rear case further includes a parallel surface 124 that is parallel to the second welded region 50. The parallel surface 124 is formed outside of the second welded region 50 (the side opposite to the inside of the housing 10 with the second welded region 50 being a reference). The parallel surface 124 is a surface extending outward in the Y-axis direction from the second welded region 50, and faces the stepped surface 116 in the Z-axis direction with a gap therebetween. Further, the parallel surface 124 is favorably a surface parallel to the second welded region 50, but as a matter of course, the present technology is not limited thereto. In addition, the parallel surface 124 is also provided over the entire circumference along the second welded region 50 similarly to the stepped surface 116, but the present technology is not limited thereto.

Note that, in FIG. 3, a width Y1 of the stepped surface 116 along the Y-axis direction is favorably equal to a width Y2 of the parallel surface 124 along the Y-axis direction. In other words, it is favorable that the outer peripheral end of the stepped surface 116 and the outer peripheral end of the parallel surface 124 be located at the same position when the sensor module 100 is viewed from the optical-axis direction (the Z-axis direction) from the viewpoint of achieving miniaturization of the sensor module 100. The widths Y1 and Y2 and the height of the stepped portion 115 are not particularly limited and can be discretionarily designed.

As described above, the stepped portion 115 and the stepped surface 116 of the opening end 114 face the parallel surface 124 of the joining surface 123 with a predetermined gap therebetween, so that even if the melted resin protrudes from the welded portion W, the resin can be accommodated within the space portion partitioned by the stepped portion 115, the stepped surface 116, and the parallel surface 124. This prevents the resin from protruding to the outer peripheral surface of the housing 10 and thus eliminates a possibility of causing an appearance defect of the product.

[Details of Groove]

Figure 4:
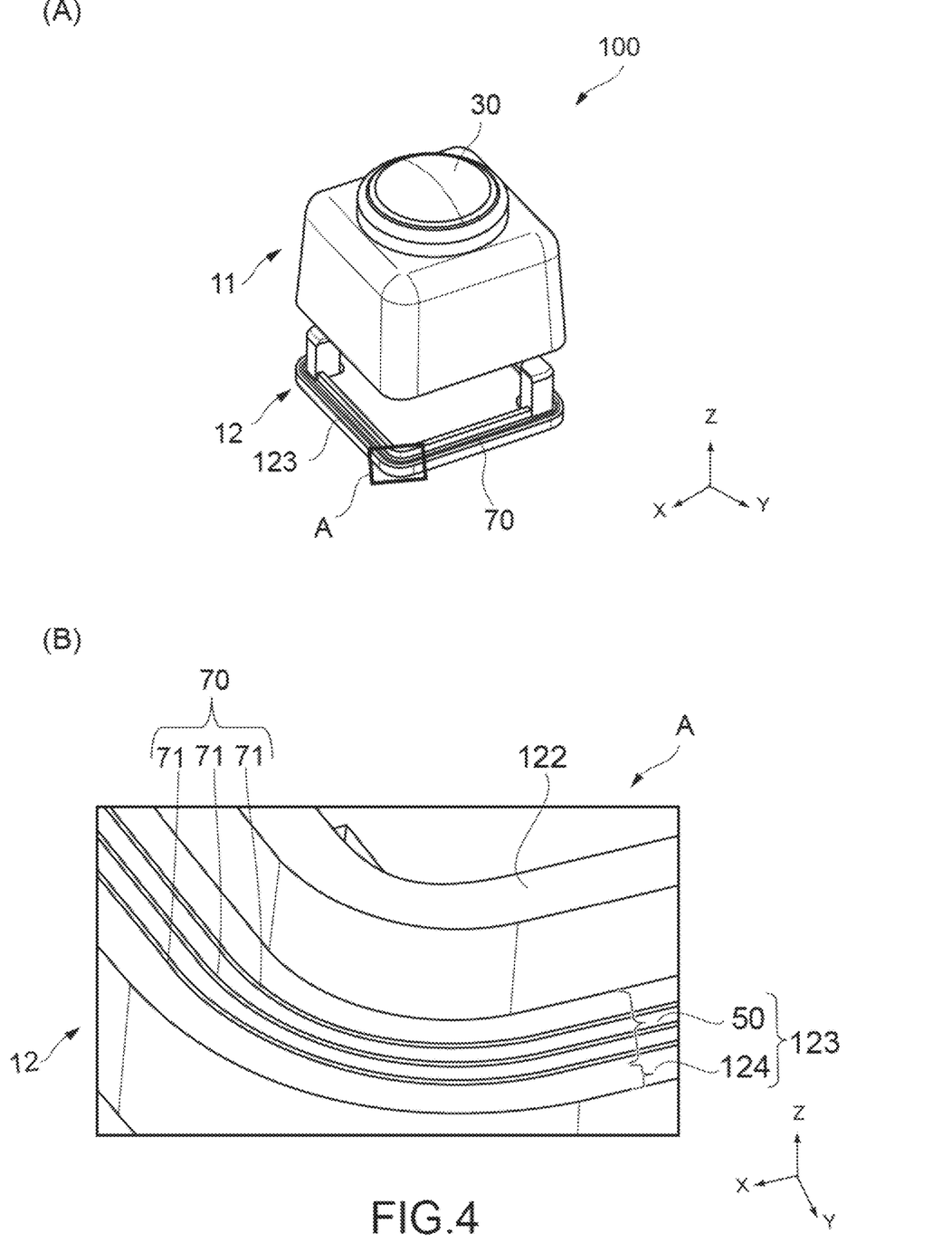

(A) of FIG. 4 is an exploded perspective view of the sensor module 100 of this embodiment, and (B) of FIG. 4 is an enlarged view of a portion A in (A) of FIG. 4 (a part of the joining surface 123 of the rear case 12). (A) of FIG. 5 is a cross-sectional view of the welded portion W formed by the opening end 114 and the joining surface 123 of the rear case 12. (B) of FIG. 5 is a cross-sectional view that is similar to (A) of FIG. 5 and used to describe a process of laser welding for the opening end 114 and the joining surface 123.

As shown in (A) and (B) of FIG. 4, a groove 70 is provided in the joining surface 123 of the rear case. As shown in (A) of FIG. 4, the groove 70 is formed over the entire circumference along the second welded region 50 in which the opening end 114 and the joining surface 123 face each other and are welded to each other. Further, the groove 70 is continuously formed over the entire circumference of the second welded region 50. The phrase "continuously formed over the entire circumference" used herein means that the groove 70 is formed without being interrupted along the second welded region 50. For example, this is like one stroke made to form a circle by returning to the start position of the stroke. Further, of course, the groove 70 may be formed discontinuously (intermittently) over the entire circumference of the second welded region 50.

Further, the groove 70 includes a plurality of first grooves 71 formed in parallel over the entire circumference of the second welded region 50. The plurality of first grooves 71 refers to, for example, three grooves provided side by side as shown in (B) of FIG. 4, but as a matter of course, the present technology is not limited thereto. Two grooves or three or more grooves may be provided. As shown in (B) of FIG. 4, the plurality of first grooves 71 is formed at equal intervals along the second welded region 50. Further, as will be described later, the plurality of first grooves 71 may not be formed at equal intervals.

In this embodiment, the groove 70 is provided in the second welded region 50, but the groove 70 may be provided in the first welded region 40 as will be described later, or the grooves 70 may be provided in both the first welded region 40 and the second welded region 50. In other words, the groove 70 only needs to be formed in at least one of the first welded region 40 or the second welded region 50.

[Method of Producing Sensor Module]

When the sensor module 100 is produced, the barrel member 60, the sensor board 20, and the like are sequentially incorporated into the front case 11, and then the joining surface 123 of the rear case 12 is brought into contact with the opening end of the front case 11. Here, the sensor board 20 is electrically connected with the connector 30 through the flexible printed circuit 40.

Subsequently, laser light L is irradiated from the rear case 12 side toward the opening end 114 in a state in which the rear case 12 is pressed against the front case 11 with a constant pressure P, as illustrated in (A) of FIG. 5. The front case 11 is made of a resin material that has absorptive properties with respect to the laser light L, and the rear case 12 is made of a resin material that has transmissive properties with respect to the laser light L. Thus, the laser light L is transmitted through the rear case 12 to be irradiated onto the opening end 114 of the front case 11. The laser light L is rectangularly annularly scanned along the opening end 114. The laser light L may be a continuous wave or a pulsed wave.

A region, in the opening end 114, which is irradiated with the laser light L, generates heat due to absorption of the laser light L to be partially melted. In this embodiment, the stepped surface 116 having the configuration described above is provided to the outer peripheral edge of the opening end 114. Thus, only an inner peripheral region (the first welded region 40) of the opening end 114 that is not provided with the stepped surface 116 is melted.

The joining surface 123 facing the first welded region 40 (mainly the second welded region 50) is also partially melted due to heat transfer from the melted portion (the first welded region 40) of the opening end 114. Thereafter, the melted portion of the first welded region 40 and the melted portion of the joining surface 123 (mainly the second welded region 50) are cooled to be solidified, and the front case 11 and the rear case 12 are welded to each other. Since the laser light L is continuously scanned circumferentially along the rectangularly annular opening end 114, welding is performed on an all-around region of the opening end 114. This results in ensuring sealing properties between the front case 11 and the joining surface 123 of the rear case 12.

Note that in the above description, the laser light L is irradiated and scanned over the entire circumference along the first welded region 40, but of course the present technology is not limited thereto. The laser light L may be partially irradiated onto the first welded region 40.

In this embodiment, as shown in (A) of FIG. 5, since the groove 70 is provided in the second welded region 50, the second welded region 50 including the groove 70 is irradiated with the laser light L at the time of laser welding. As shown in (B) of FIG. 5, the resin melted by the laser light L is then filled in the groove 70. This makes it possible to prevent the melted resin from protruding from the housing 10. In addition, since the resin can be prevented from protruding, the widths of the parallel surface 124 and the stepped surface 116 can also be narrowed, so that the size of the product can be reduced. The melted resin used herein is not limited to the resin constituting the front case 11. In other words, the groove 70 is capable of accommodating a melted resin of at least one of the front case 11 or the rear case 12.

In addition, since the irradiation range for the laser light L on the joining surface 123 is the second welded region 50, in order to prevent the melted resin from protruding to the outside, it is possible to save the time and effort required for precise adjustment of the irradiation position of the laser light L, such as adjustment of the irradiation position of the laser light L toward the inner side of the housing 10 in the second welded region 50. This makes it possible to improve the workability. Further, since the melted resin enters the groove 70, it is possible to increase the weld strength between the front case 11 and the rear case 12 by the resin that has entered the groove 70 (anchor effect). The groove 70 acts as a relief margin for the melted resin, and also acts as a welded portion W when the melted resin enters the groove 70. Therefore, it is not necessary to separately provide the structure having only the effect of the relief margin on the side lateral to the scanning locus (irradiation range) of the laser light, it contributes to miniaturization of the joining surface 123, eventually the housing 10.

Note that the inside of the groove 70 (each first groove 71) does not need to be filled with the melted resin without gaps, and gaps may remain partially.

The positions for forming the plurality of first grooves 71 are not particularly limited. Typically, the first grooves 71 are formed so as to cover the entire range of the second welded region 50, but the present technology is not limited thereto. The first grooves 71 may be formed at positions biased toward the outer peripheral side (the parallel surface 124 side) of the joining surface 123.

Further, the intervals between the first grooves 71 are typically constant, but the intervals may be changed for each region so as to become denser toward the outer side of the second welded region 50. For example, the first grooves 71 may be provided such that the intervals between the first grooves 71 gradually become narrower toward the outer side of the joining surface 123, or the intervals between only any number of targeted first grooves 71 on the outer peripheral side among the plurality of first grooves 71 may be set to be narrower as being closer to the outer peripheral side.

Further, among the plurality of first grooves 71, the cross-sectional area of the first groove 71 located on the outermost side of the joining surface 123 may be larger than the cross-sectional area of the first groove 71 located on the innermost side of the joining surface 123. Further, among the plurality of first grooves 71, the width or depth of the first groove 71 located on the outermost side of the joining surface 123 may be larger than the width or depth of the first groove 71 located on the innermost side of the joining surface 123.

As described above, since the first grooves 71 are formed more densely on the outer peripheral side than on the inner peripheral side of the joining surface 123, it is possible to further prevent the resin melted by the irradiation of the laser light L from protruding to the outside of the housing 10.

Note that the cross-sectional area of the first groove 71 refers to an area of a cross-section formed when the first groove 71 is cut in the depth direction thereof.

Further, the width of the first groove 71 refers to the opening width thereof.

In this embodiment, as shown in FIG. 5 and the like, the cross-section of the groove 70 (first groove 71) has a substantially semicircular shape, but it is not limited thereto and may be, for example, a rectangular shape, a V-shape, or a U-shape.

Figure 6:
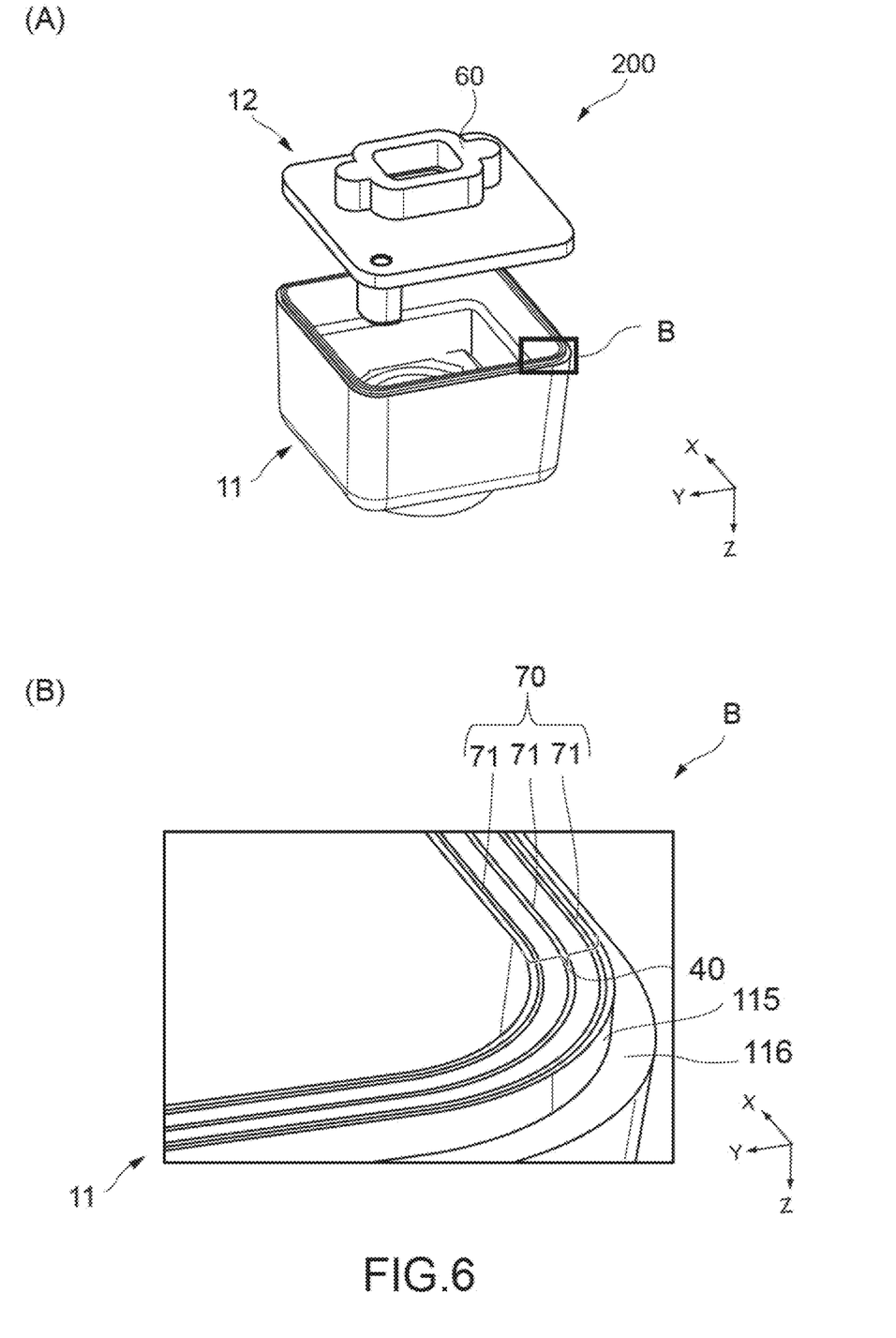
Figure 7:
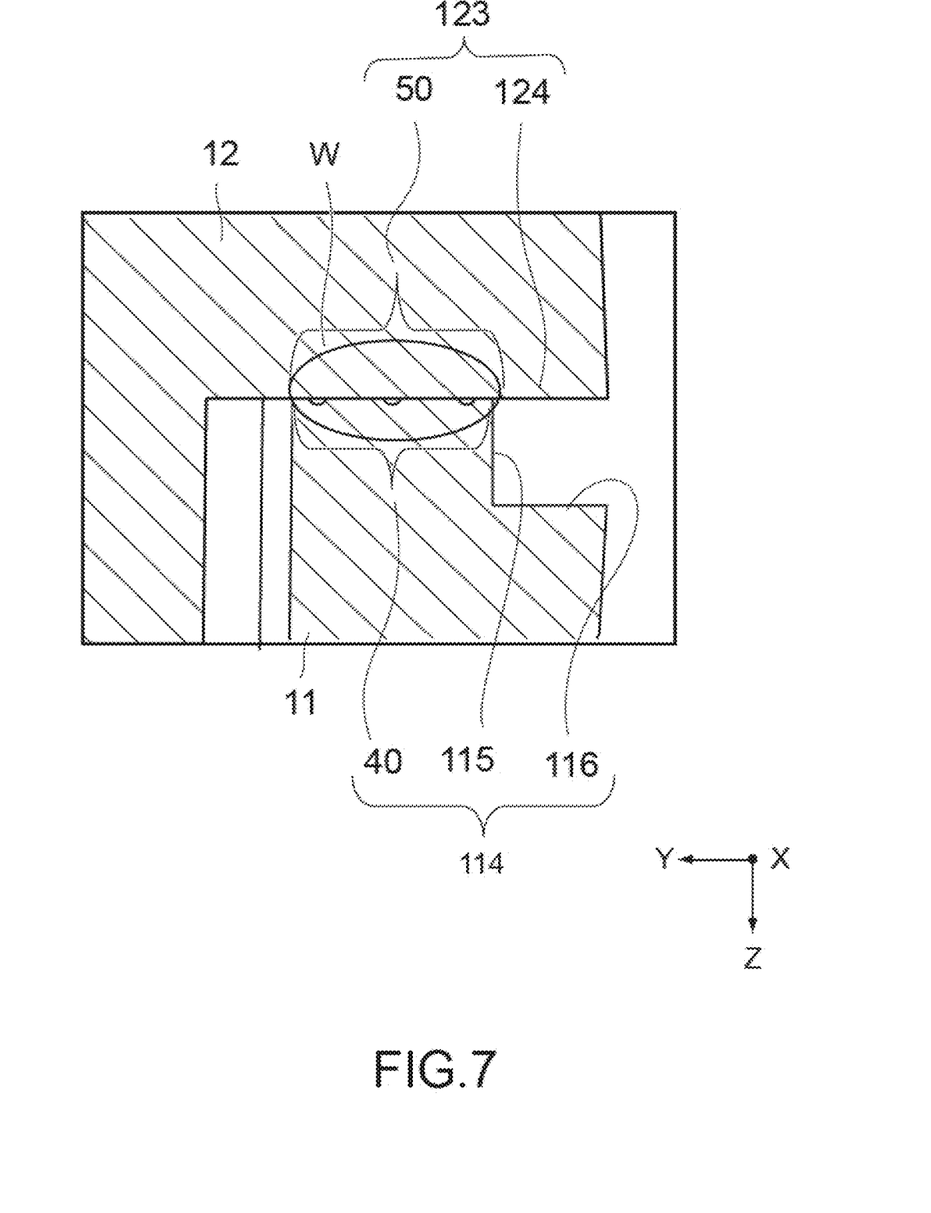
FIG. 7 is a longitudinal cross-sectional view of a welded portion of the sensor module.

Second Embodiment (A) of FIG. 6 is an exploded perspective view of a sensor module 200 according to a second embodiment of the present technology, and (B) of FIG. 6 is an enlarged view of a portion B in (A) of FIG. 6. FIG. 7 is an enlarged cross-sectional view of a welded portion. Hereinafter, configurations different from those in the first embodiment will be mainly described, and configurations similar to those in the first embodiment will be denoted by similar reference symbols, and description thereof will be omitted or simplified.

This embodiment is different from the first embodiment in that the groove 70 is provided at the opening end 114 of the front case 11. In this embodiment, the groove 70 is provided in the first welded region 40 of the opening end 114. As in the first embodiment, the groove 70 is formed of a plurality of grooves (first grooves 71) continuously formed over the entire circumference of the first welded region and arranged in parallel with each other. Also in this embodiment, the number of first grooves 71, the arrangement pitch, the shape, and other configurations are similar to those in the first embodiment, and thus description thereof will be omitted.

Figure 8:
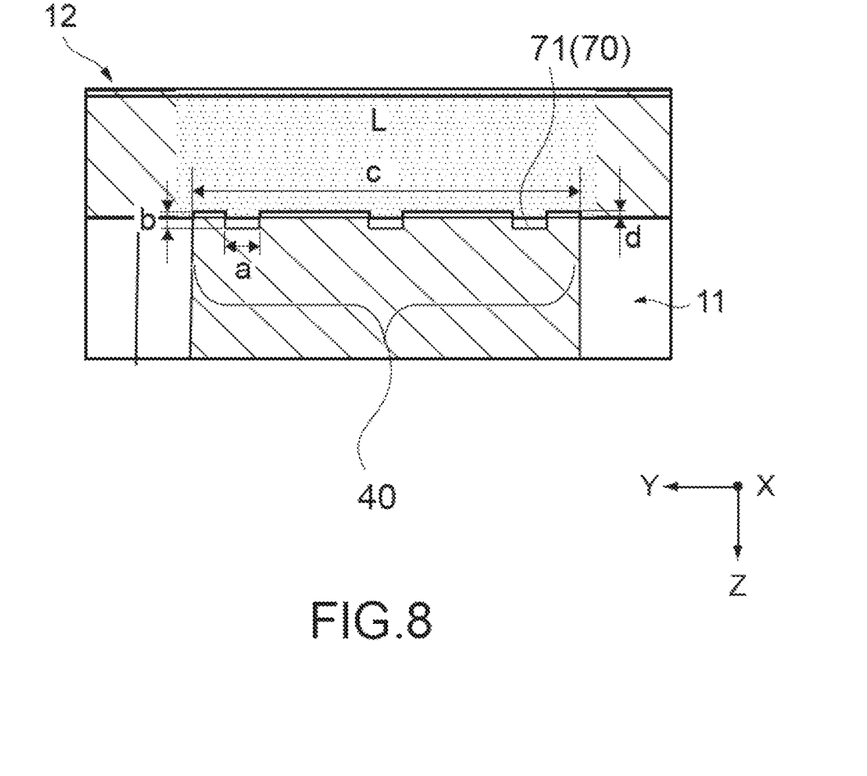
FIG. 8 is an explanatory view of a protrusion suppression rate for a melted resin.

Here, the effect of suppressing protrusion of a melted resin by the groove 70 will be described. FIG. 8 is an explanatory view of the effect of suppressing protrusion of a melted resin.

As shown in FIG. 8, a width of the first welded region 40 along the Y-axis direction is denoted by c, a sinking amount of the rear case 12 with respect to the front case 11 at the time of welding is denoted by d, a width of the groove 70 (first groove 71) along the Y-axis direction at the bottom portion is denoted by a, a depth of the groove 70 (first groove 71) is denoted by b, and the number of first grooves 71 is denoted by n. Here, assuming that the quantitative ratio of the resin accommodated in the groove 70 with respect to the melted resin generated in the welding is a melted resin protrusion suppression ratio S, its value is represented by the following equation.

$$S = (n \times a \times b) \div (c \times d) \times 100 [\%]$$

Typically, as the numerical value of the suppression ratio S becomes higher, the effect of suppressing protrusion of the melted resin becomes higher, but if the first term on the right side (n×a×b) is extremely large, the weld strength tends to decrease due to a decrease in the welding area. Therefore, a suitable suppression ratio is, for example, 10 to 40%, and more favorably 10 to 30%.

Third Embodiment

Figure 9:
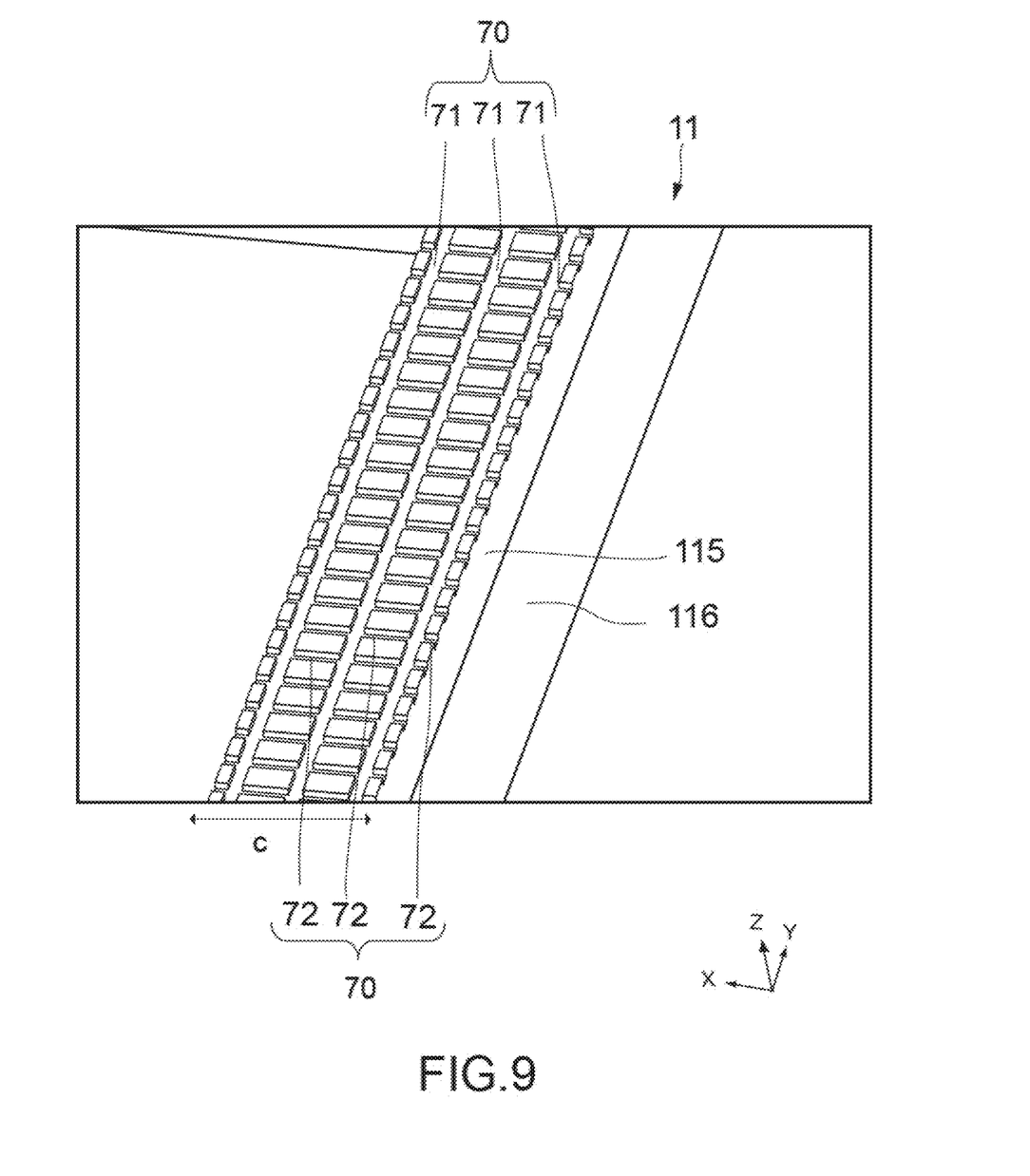
FIG. 9 is a perspective view of a main part according to a third embodiment of the present technology.

FIG. 9 is an enlarged view of a main part of the front case 11 showing a third embodiment of the present technology. Hereinafter, configurations different from those in the first embodiment will be mainly described, configurations similar to those in the second embodiment will be denoted by similar reference symbols, and description thereof will be omitted or simplified.

This embodiment is different from the embodiments described above in that the groove 70 further includes a plurality of first grooves 71 and a plurality of second grooves 72. Here, an example in which the groove 70 is formed in the opening end 114 (the second welded region 50) of the front case 11 will be described, but the present technology is not limited thereto, and the same applies to a case in which the groove 70 is formed in the joining surface (the first welded region 40) of the rear case 12.

As shown in FIG. 9, the plurality of second grooves 72 is formed in a direction intersecting with the plurality of first grooves 71. The intersecting direction is typically a direction orthogonal to the plurality of first grooves 71, but the present technology is not limited thereto. The intersecting direction may be a direction obliquely intersecting with the plurality of first grooves 71. Further, it is not necessary to form the plurality of second grooves 72 in the same direction. It is favorable that each of the second grooves 72 be continuously formed so as to cause the outer peripheral side and the inner peripheral side of the opening end 114 to communicate with each other.

According to this embodiment, since the groove 70 includes the plurality of first and second grooves 71 and 72, the amount of melted resin that can be accommodated in the groove 70 can be increased. This makes it possible to further suppress the protrusion of the melted resin to the outer peripheral surface of the housing.

Further, the second groove 72 is formed so as to cause the outer peripheral side and the inner peripheral side of the opening end 114 to communicate with each other, which allows the air remaining in the groove 70 at the time of welding to escape to the inner peripheral side or outer peripheral side of the housing 10 through the second groove 72. This makes it possible to avoid a welding failure caused by the expansion of the air remaining in the groove 70 at the time of welding and to ensure a stable weld strength.

Note that the second groove 72 may be formed so as to communicate only with the inner peripheral side of the housing 10. In this case, since the melted resin that cannot be accommodated in the groove 70 at the time of welding can be preferentially guided to the inner peripheral side of the housing 10, it is possible to suppress the occurrence of resin burrs on the outer peripheral surface of the housing 10.

Further, the cross-sectional areas of the plurality of first grooves 71 and the plurality of second grooves 72 need not be the same, and either one of them may be increased. Further, the cross-sectional area of the plurality of second grooves 72 may be configured to increase toward the outer side. This makes it possible to ensure a large amount of space in which the melted resin toward the outer side is filled, so that the resin can be prevented from protruding.

Further, the number of grooves in the plurality of first grooves 71 and the plurality of second grooves 72 can be appropriately suitably designed.

Modified Examples

The technology according to the present disclosure can be applied to various products. For example, the technology according to the present disclosure may be provided as a sensor module that is mounted on one of the types of mobile bodies such as vehicle, electric vehicle, hybrid electric vehicle, motorcycle, bicycle, personal mobility, airplane, drone, ship, robot, construction machinery, and agricultural machinery (tractor).

Further, a camera module has been described as an example of the sensor module 100 in the embodiments described above. However, the present technology is not limited thereto. For example, the present technology can also be adopted for a sensor module that includes, as a sensor element, a ranging sensor such as light detection and ranging (LiDAR) or a time-of-flight (ToF) sensor.

Note that the present technology may also take the following configurations.

(1) A sensor module, including:
a sensor element;
a first case that includes an opening end including a first welded region and accommodates therein the sensor element;
a second case that includes a joining surface including a second welded region, the second welded region being welded to the first welded region to form a welded portion; and
a groove that is formed in at least one of the first welded region or the second welded region.

(2) The sensor module according to (1), in which the groove is formed over an entire circumference of the first welded region or the second welded region.

(3) The sensor module according to (2), in which the groove is formed continuously over the entire circumference of the first welded region or the second welded region.

(4) The sensor module according to (2), in which the groove includes a plurality of first grooves formed in parallel over the entire circumference of the first welded region or the second welded region.

(5) The sensor module according to (4), in which the number of the plurality of first grooves is three or more, and
the plurality of first grooves is formed more densely toward an outer side of the first welded region or the second welded region.

(6) The sensor module according to (4) or (5), in which among the plurality of first grooves, a first groove located on an outermost side of the joining surface has a cross-sectional area larger than a cross-sectional area of a first groove located on an innermost side of the joining surface.

(7) The sensor module according to (4) or (5), in which among the plurality of first grooves, a first groove located on an outermost side of the joining surface has a width or depth larger than a width or depth of a first groove located on an innermost side of the joining surface.

(8) The sensor module according to any one of (4) to (7), in which
the groove further includes a plurality of second grooves extending in a direction intersecting with the plurality of first grooves.

(9) The sensor module according to any one of (1) to (8), in which
the opening end further includes a stepped surface that is formed outside of the first welded region in parallel to the first welded region,
the joining surface further includes a parallel surface that is formed outside of the second welded region in parallel to the second welded region, and
the stepped surface and the parallel surface face each other via a gap.

(10) The sensor module according to any one of (1) to (9), in which
the first case is made of a resin material that absorbs laser light of the predetermined wavelength, and
the second case is made of a resin material that transmits the laser light of the predetermined wavelength.

(11) The sensor module according to (10), in which
the groove is filled with the resin material melted from the first case or the second case.

(12) The sensor module according to any one of (1) to (11), in which
the sensor element is an imaging device.

(13) The sensor module according to any one of (1) to (12), in which
the first case and the second case are joined to each other using laser welding.

REFERENCE SIGNS LIST 11 front case (first case)
12 rear case (second case)
20 sensor board
30 barrel
40 first welded region
50 second welded region
60 connector
70 groove
71 first groove
72 second groove
100, 200 sensor module
114 opening end
123 joining surface
L laser light

The invention claimed is:

1. A sensor module, comprising:
a sensor element;
a first case that includes an opening end including a first welded region and accommodates therein the sensor element;
a second case that includes a joining surface including a second welded region, the second welded region being welded to the first welded region to form a welded portion; and
a groove that is formed in at least one of the first welded region or the second welded region
wherein the groove is formed over an entire circumference of the first welded region or the second welded region; and
wherein the groove includes a plurality of first grooves formed in parallel over the entire circumference of the first welded region or the second welded region; and
among the plurality of first grooves, a first groove located on an outermost side of the joining surface has a cross-sectional area larger than a cross-sectional area of a first groove located on an innermost side of the joining surface.

2. The sensor module according to claim 1, wherein
the groove is formed continuously over the entire circumference of the first welded region or the second welded region.

3. The sensor module according to claim 1, wherein
the number of the plurality of first grooves is three or more, and
the plurality of first grooves is formed more densely toward an outer side of the first welded region or the second welded region.

4. The sensor module according to claim 1, wherein
among the plurality of first grooves, a first groove located on an outermost side of the joining surface has a width or depth larger than a width or depth of a first groove located on an innermost side of the joining surface.

5. The sensor module according to claim 1, wherein
The groove further includes a plurality of second grooves extending in a direction intersecting with the plurality of first grooves.

6. The sensor module according to claim 1, wherein
the opening end further includes a stepped surface that is formed outside of the first welded region in parallel to the first welded region,
the joining surface further includes a parallel surface that is formed outside of the second welded region in parallel to the second welded region, and
the stepped surface and the parallel surface face each other via a gap.

7. The sensor module according to claim 1, wherein
the first case is made of a resin material that absorbs laser light of the predetermined wavelength, and
the second case is made of a resin material that transmits the laser light of the predetermined wavelength.

8. The sensor module according to claim 7, wherein
the groove is filled with the resin material melted from the first case or the second case.

9. The sensor module according to claim 1, wherein
the sensor element is an imaging device.

10. The sensor module according to claim 1, wherein
the first case and the second case are joined to each other using laser welding.

11. The sensor module according to claim 1, wherein
the first welded region is in a first resin portion and the second welded region is in a second resin portion,
one of the first resin portion welded region and the second welded region is a resin material having transmissive properties with respect to a specified laser light and the other of the first resin portion welded region and the second welded region is a resin material having transmissive properties with respect to the specified laser light.

12. The sensor module according to claim 1, wherein
the sensor module is a camera for a vehicle.

* * * * *